(12) United States Patent
Liao (10) Patent No.: US 7,342,392 B2
(45) Date of Patent: Mar. 11, 2008

(54) SWITCHING REGULATOR WITH SLOPE COMPENSATION INDEPENDENT OF CHANGES IN SWITCHING FREQUENCY

(75) Inventor: Chiawei Liao, San Jose, CA (US)

(73) Assignee: Linear Technology Corporation, Milpitas, CA (US)

(*) Notice: Subject to any disclaimer, the term of this patent is extended or adjusted under 35 U.S.C. 154(b) by 288 days.

(21) Appl. No.: 11/201,430

(22) Filed: Aug. 11, 2005

(65) Prior Publication Data

US 2007/0035283 A1 Feb. 15, 2007

(51) Int. Cl.
*G05F 1/00* (2006.01)
(52) U.S. Cl. ............... 323/382; 323/284; 323/285; 323/288; 327/175
(58) Field of Classification Search ............... None
See application file for complete search history.

(56) References Cited

U.S. PATENT DOCUMENTS

| 4,837,495 | A | * | 6/1989 | Zansky ............ 323/222 |
| 4,975,820 | A | * | 12/1990 | Szepesi ............ 363/21.17 |
| 5,079,453 | A | * | 1/1992 | Tisinger et al. ...... 327/132 |
| 5,315,498 | A | | 5/1994 | Berrios et al. |
| 5,438,499 | A | * | 8/1995 | Bonte et al. ........ 363/21.16 |
| 5,831,420 | A | | 11/1998 | Myers |
| 5,861,735 | A | * | 1/1999 | Uchida ............ 323/271 |
| 5,903,452 | A | * | 5/1999 | Yang ............ 363/97 |
| 5,929,620 | A | | 7/1999 | Dobkin et al. |
| 6,137,696 | A | * | 10/2000 | Hall et al. ........ 363/21.05 |
| 6,177,787 | B1 | | 1/2001 | Hobrecht |
| 6,285,174 | B1 | | 9/2001 | Suzuki |
| 6,366,070 | B1 | | 4/2002 | Cooke et al. |
| 6,369,665 | B1 | | 4/2002 | Chee et al. |
| 6,498,466 | B1 | * | 12/2002 | Edwards ............ 323/282 |
| 6,522,116 | B1 | * | 2/2003 | Jordan ............ 323/288 |
| 7,145,375 | B2 | * | 12/2006 | Han ............ 327/175 |
| 7,176,668 | B2 | * | 2/2007 | Oswald et al. ........ 323/285 |
| 2006/0284607 | A1 | * | 12/2006 | Isobe ............ 323/282 |

FOREIGN PATENT DOCUMENTS

GB   2 324 916 A   11/1998

OTHER PUBLICATIONS

"Low-Power BICMOS Current-Mode PWM," Technical Datasheet, 2001, pp. 1-9, XP002402738, Texas Instruments Incorporated.
Saggini, et al., "A low-complexity high-performance digital control architecture for Voltage Regulator Modules," PESC '03, Jun. 15, 2003, pp. 121-126, vol. 4 of 4, Conf. 34, IEEE.
International Search Report and Written Opinion of the International Searching Authority issued in corresponding International Patent Application No. PCT/US2006/017697, dated Nov. 2, 2006.

* cited by examiner

*Primary Examiner*—Bao Vu
*Assistant Examiner*—Emily P Pham
(74) *Attorney, Agent, or Firm*—McDermott Will & Emery LLP (57) ABSTRACT

Compensation for a switching regulator is attained by developing a compensation signal for a switching regulator that is independent of changes in the switching frequency. The regulator operational frequency is established in accordance with a repetitive ramp signal of constant slope and adjustable frequency. The voltage of the ramp signal is monitored and an offset signal is derived therefrom. The peak value of the ramp signal, detected during monitoring, is used to derive the offset signal. Initiation of the compensation occurs at the same duty cycle point during each switching cycle and thus is independent of switching frequency. The compensation signal may have a linear or non-linear slope.

17 Claims, 10 Drawing Sheets

SWITCHING REGULATOR WITH SLOPE COMPENSATION INDEPENDENT OF CHANGES IN SWITCHING FREQUENCY

TECHNICAL FIELD

This disclosure is related to switching regulators, and more particularly to provision of compensation during control of the switching duty cycle.

BACKGROUND

The use of current mode switching regulators to control a DC output voltage at a level higher than, lower than, or the same as an input voltage is well known. Typically, one or more switches are activated to supply current pulses via an inductor to charge an output capacitor. The output voltage level is maintained at a desired level by adjusting the on and off times of the switching pulses in accordance with output voltage and load conditions.

Figure 1:
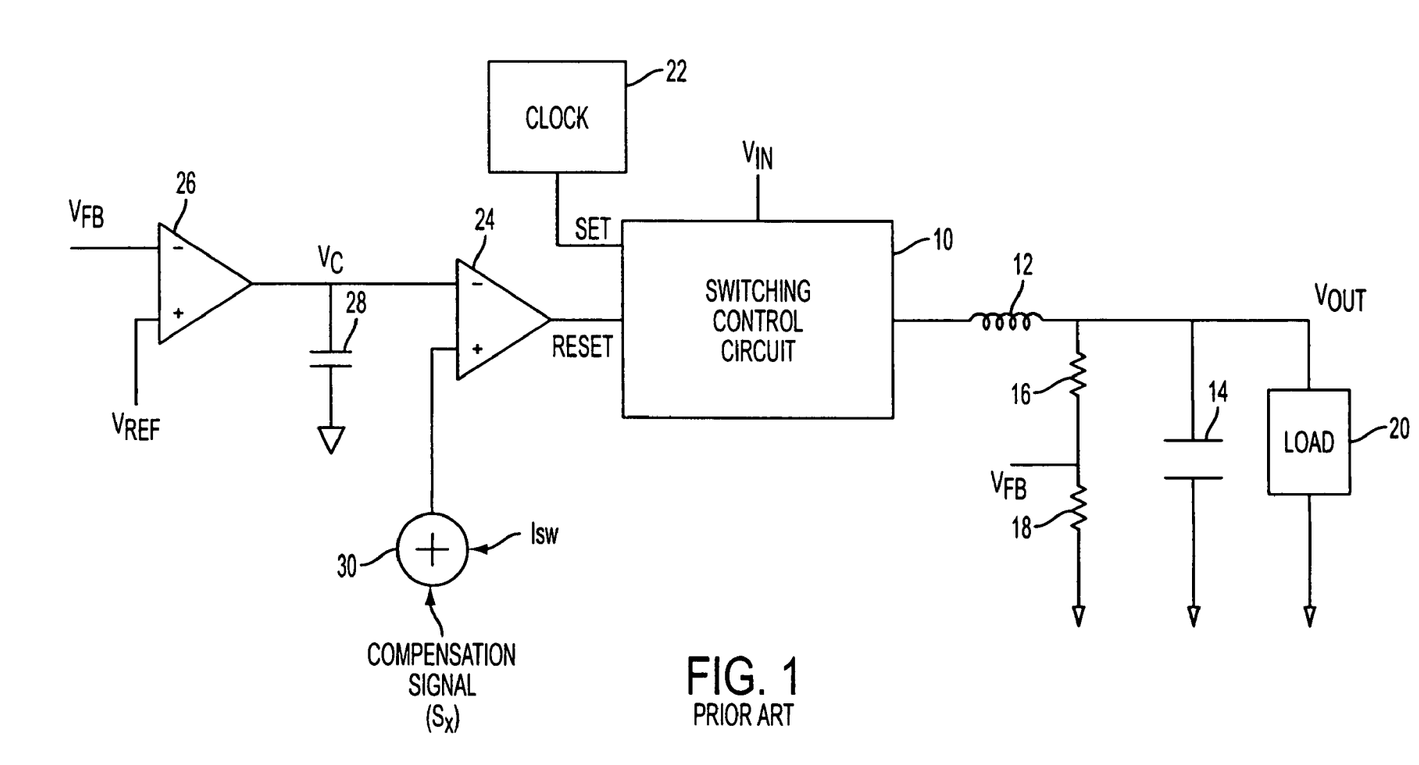
FIG. 1 is a block diagram of a typical current mode switching regulator.

FIG. 1 is a block diagram of a typical current mode switching regulator. Switching control circuit 10 may comprise any of various known controllers that provide pulse width modulated output pulses to regulate a DC output voltage $V_{OUT}$ at a level that may be greater than, lower than, or the same as a nominal input voltage $V_{IN}$. Typically, the control circuit includes a latch, having set and reset inputs, coupled to a controlled switch that supplies switched current $I_{SW}$ to inductor 12. Capacitor 14 is connected between the output $V_{OUT}$ and ground. Resistors 16 and 18 are connected in series between $V_{OUT}$ and ground. A load 20 is supplied from the regulator output.

The set input is coupled to clock 22, which may generate pulses in response to an oscillator. During normal operation, the latch is activated to initiate a switched current pulse when the set input receives each clock pulse. The switched current pulse is terminated when the reset input receives an input signal, thereby determining the width of the switched current pulse. The reset input is coupled to the output of comparator 24. An output voltage feedback signal $V_{FB}$ is taken at the junction of resistors 16 and 18 and coupled to negative input of error amplifier 26. A voltage reference $V_{REF}$ is applied to the positive input of error amplifier 26. Capacitor 28 is coupled between the output of error amplifier 26 and ground.

The level of charge of capacitor 28, and thus its voltage $V_C$, is varied in dependence upon the output of amplifier 26. As load current increases, the output voltage, and thus $V_{FB}$, decreases. As the feedback voltage $V_{FB}$ decreases, $V_C$ increases. Thus, $V_C$ is proportional to load current. $V_C$ is coupled to the inverting input of comparator 24. The non-inverting input is coupled to adder 30. Adder 30 combines signal $I_{SW}$, which is proportional to the sensed switch current, with a compensation signal. Upon switch activation in response to a clock set signal, switch current builds through inductor 12. When the level of the signal received from adder 30 exceeds $V_C$, comparator 24 generates a reset signal to terminate the switched current pulse. During heavier loads, $V_C$ increases and the switched current pulse accordingly increases in length to appropriately regulate the output voltage $V_{OUT}$.

Figure 2:
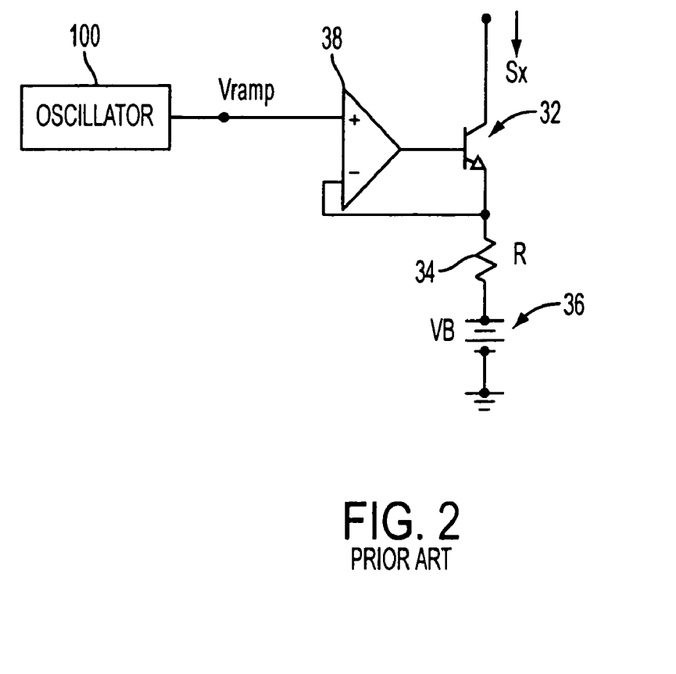
FIG. 2 is a circuit diagram of a prior art slope compensation generator.

For normal regulator operation at duty cycles of fifty percent or higher, compensation is needed in the switching control to avoid sub-harmonic oscillation. A typical compensation approach is termed "slope compensation," wherein a signal of increasing magnitude is added to the current signal $I_{SW}$, or subtracted from the signal $V_C$, during each switching cycle. FIG. 2 is a circuit diagram of a prior art slope compensation generator that may be input to adder 30 to modify the current signal applied to the non-inverting input of comparator 24. The output of the circuit is a current signal Sx, corresponding to the current in the series circuit path of transistor 32, resistor (R) 34 and voltage bias (VB) source 36. The base of transistor 32 is coupled to the output of unity gain buffer amplifier 38. The positive input of amplifier 38 is coupled to receive an oscillator generated ramp signal Vramp. The negative input of amplifier 38 is coupled to the junction between transistor 32 and resistor 34.

Figure 3:
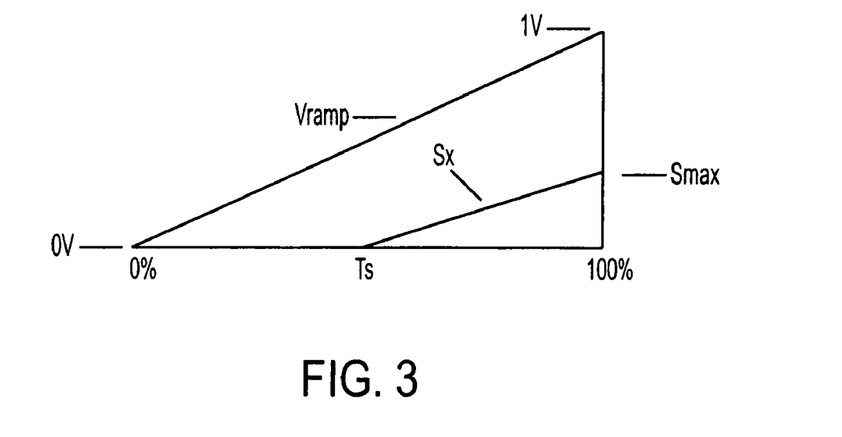
FIG. 3 is a simplified waveform diagram illustrative of the compensation function of the circuit of FIG. 2.

FIG. 3 is a simplified waveform diagram illustrative of the compensation function of the circuit of FIG. 2. The Vramp signal is a sawtooth format signal that is generated at the beginning of each clock cycle and extends at linear slope to the end of the cycle, corresponding to one hundred percent duty cycle. As an example, the Vramp magnitude may vary between zero and one volt. Transistor 32 begins conduction at a percent duty cycle point Ts at which Vramp overtakes the fixed voltage VB. As compensation is needed at fifty percent duty cycle operation or greater, VB typically is arbitrarily chosen at one half the value of the maximum Vramp level, or one half-volt in the present example. Ts thus will be at fifty percent duty cycle. As Vramp continues to increase after point Ts, the base signal applied to transistor 32 increases and, thus, the output current Sx increases linearly to a maximum Smax at the end of the switching cycle. Sx is determined by (Vramp-VB)/R. The compensation curve Sx starting point Ts is thus determined by VB, and its slope is determined by R. In this example, Ts occurs at fifty percent of the switching cycle at the oscillator operating frequency, regardless of the actual switch duty cycle. Compensation is provided throughout an operational range of fifty to one hundred percent switch duty cycle.

Figure 4:
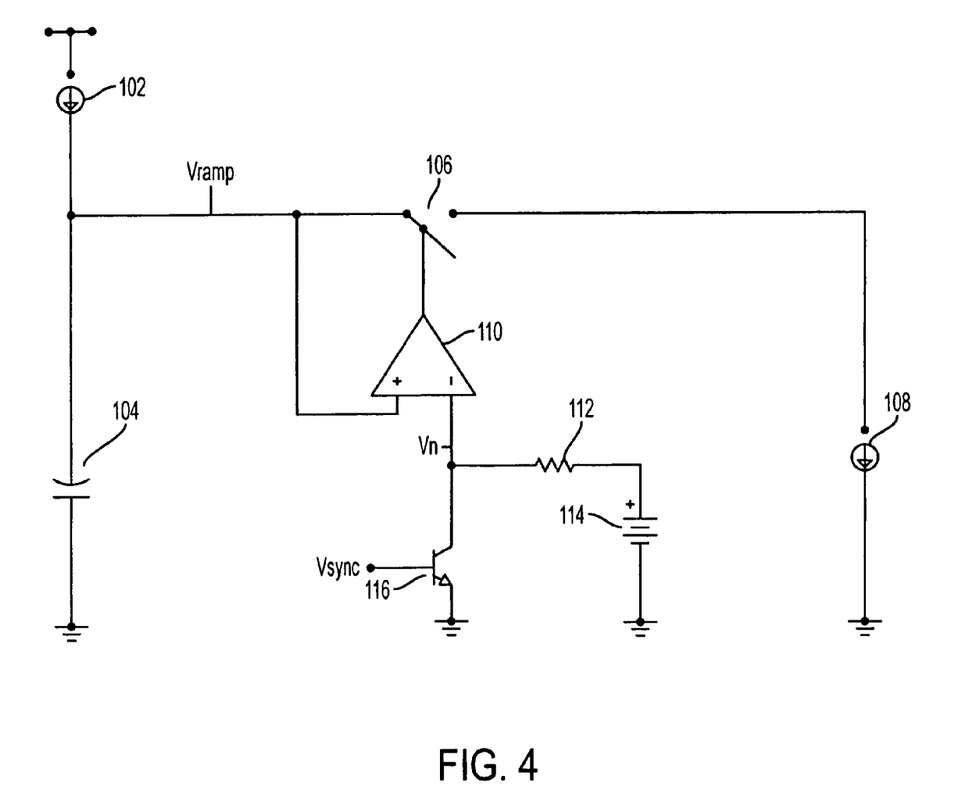
FIG. 4 is a circuit diagram of a typical oscillator circuit used for producing the Vramp signal.

FIG. 4 is a circuit diagram of a typical oscillator circuit used for producing the Vramp signal. Constant current source 102 is connected in series with capacitor 104. Coupled across capacitor 104 is the series arrangement of controlled switch 106, shown schematically, and constant current source 108. Switch 106 assumes a closed, or conductive, state in response to a high logic level output of comparator 110. The positive input of comparator 110 is coupled to the junction between constant current source 102 and capacitor 104. The negative input of comparator 110 is coupled to the series arrangement of resistor 112 and voltage reference threshold source 114. Transistor 116 is coupled in parallel with resistor 112 and source 114.

With switch 106 in the open state as shown, charge is applied to capacitor 104 to build up its voltage at a constant rate until it exceeds the voltage at the negative input, Vn, of the comparator 110. At that point, the comparator outputs a signal to activate the switch 106 to a conductive state, thereby coupling the capacitor to constant current source 108 to discharge capacitor 104. As the current source 108 is much greater than the current source 102, and the comparator is configured with sufficient hysteresis, the capacitor is quickly discharged to its base minimum level voltage. The voltage at capacitor 104 produces the Vramp signal. In the absence of application of an activation signal to the base of transistor 116, the circuit operates as a free running oscillator. The charge and discharge cycle is repeated continuously at a constant frequency dependent upon the time necessary for the voltage at capacitor 104 to rise from its base level to its threshold level of reference source 114. The time required for capacitor discharge is negligible.

The oscillator may be controlled to operate at a higher frequency by application of a higher frequency synchronous signal to the base of transistor 116. When a synchronizing pulse is applied to the base of transistor 116, the negative input to comparator 110 is coupled to ground, causing the immediate closure of switch 106 and discharge of capacitor 104 by current discharge source 108. Upon discharge of the capacitor to the base voltage level of Vramp, the comparator ceases its output signal, switch 106 again transitions to an open state, and charge is again applied to capacitor 104 to build the Vramp signal. The circuit thus will provide a Vramp signal output at the higher frequency with decreased charging period for capacitor 104.

The waveforms of FIGS. 5A-5D illustrate operation in both the free running and synchronized oscillator modes. Waveform (a) represents an external voltage signal, Vsync, applied to the base of transistor 116. Waveform (b) represents the voltage at the negative input to comparator 110. Waveform (c) represents the Vramp signal. The Vramp signal is applied to the positive input of amplifier 38 of FIG. 2. Waveform (d) represents the compensation signal Vcomp. For comparison with the waveform of FIG. 3, it is assumed that the voltage threshold source 114 is one volt and that the base line level is zero volt. 100 kHz is taken as an example of the free running oscillator frequency.

Between time $t_0$ and $t_2$, Vsync (waveform a) is zero, whereby the circuit operates as a free running oscillator at 100 kHz. Vramp (waveform c) exhibits a constant slope from a value of 0.0 volt at $t_0$ to the threshold 1.0 volt at $t_1$. The slope is dependent on the value of capacitor 104 and constant current charge source 102. Vn (waveform b) drops to 0.0 volt level from 1.0 volt during the brief period of transition of Vramp from its maximum to minimum levels. The compensation signal, Vcomp, is initiated when the Vramp signal attains the voltage VB of the reference source 32. This point is at fifty percent duty cycle, as described above with respect to FIGS. 2 and 3.

Figure 5A:
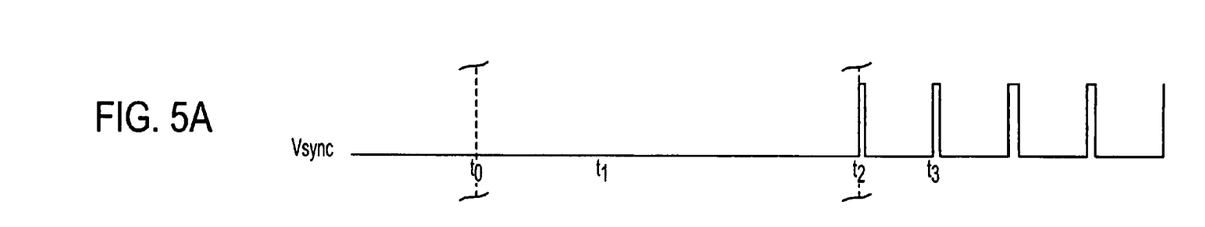
FIGS. 5A-5D are diagrams illustrating waveforms during operation of the circuit of FIGS. 1 and 2.
Figure 5B:
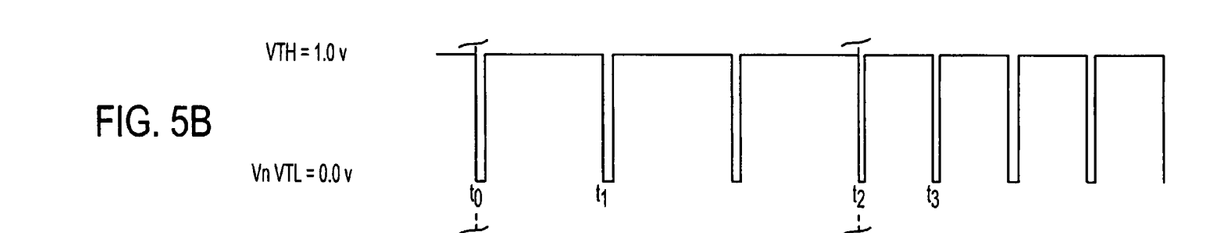
Figure 5C:
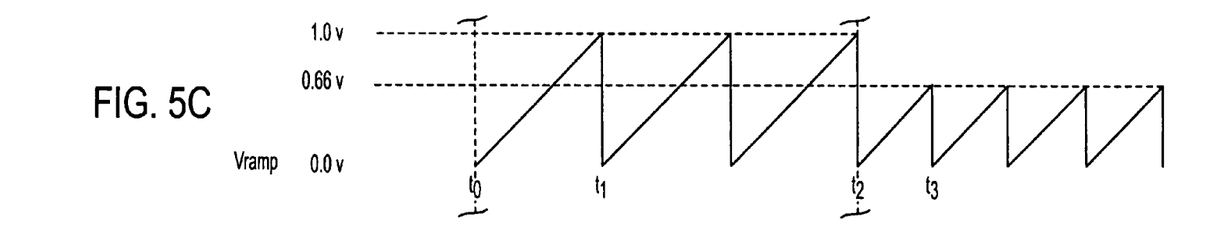

Waveforms (a)-(d) repeat as described until time $t_2$, when a Vsync signal having a frequency of 150 kHz is applied to the base of transistor 116. At that time, the voltage Vn at the negative input to comparator 110 is forced low, the Vramp signal attains the 0.0 volt level and then begins to increase. As there has been no change to the constant current charge source 102 or to the capacitor 104, the slope of Vramp remains the same. At time $t_3$, the next Vsync pulse occurs, again forcing Vn low to terminate the Vramp pulse. As the Vsync frequency of 150 kHz is greater than the 100 kHz frequency at free running operation, the time during which charge can build on capacitor 104, i.e., between $t_2$ and $t_3$, has decreased. The maximum value of the Vramp signal is 0.66 volt.

Figure 5D:
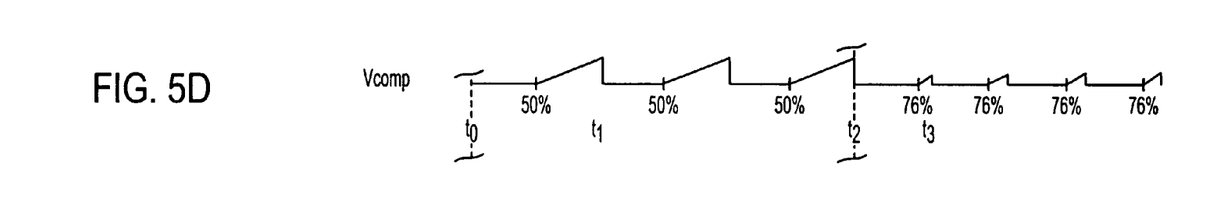

The effect of application of the 150 kHz Vramp signal to the positive input of amplifier 38 on compensation signal Vcomp is as follows. As the voltage bias (VB) source 36 remains at 0.5 volt and the slope of Vramp remains the same, the length of time required to initiate the compensation signal in each cycle remains the same. The percent duty cycle point of Ts is derived as follows: Ts/0.5 volt=100%/0.66 volt; Tx=(0.5/0.66)(100%)=76%. As illustrated in the waveform of FIG. 5D, Ts has shifted from the fifty percent duty starting point for 100 kHz frequency operation to seventy six percent duty starting point for 150 kHz frequency operation. The regulator loses slope compensation between fifty and seventy six percent duty cycle and thus becomes susceptible to sub-harmonic oscillation in that duty cycle range. If a higher frequency synchronization signal is applied to the oscillator, an even greater shift of Ts will occur. Moreover, as the slope of the compensation signal remains independent of operating frequency, Smax will attain only a small magnitude.

As $V_C$ is an indication of load, it can be monitored by internal circuitry, not shown, to detect light load conditions. In response to $V_C$ reaching a predetermined light load condition threshold, the operation can be changed to a "sleep mode," in which some circuit elements can be deactivated to conserve power. At low duty cycles at which no compensation signal is produced, the level of $V_C$ corresponds to the amount of switch and regulator output currents. At higher duty cycles at which compensation signals are produced, the level of $V_C$ corresponds to a load level less than the actual load level. As the compensation signal increases with higher duty cycles, the load level correspondence decreases. For $V_C$ to be a reasonably accurate indicator of load level, the slope compensation Sx should be at the minimum signal magnitude necessary for compensation.

To obtain adequate compensation, a compensation signal of greater magnitude is required at increased duty cycles. The slope of the linear compensation curve thus is typically set to provide the appropriate magnitude for the maximum duty cycle operation. While this curve satisfies the maximum duty requirement, it over-compensates as duty cycle operation decreases to fifty percent. As the minimum necessary compensation between fifty percent and one hundred percent duty cycle operation is not linear, $V_C$ contains an unnecessary offset component through much of that range.

The need thus exists for a slope compensation arrangement that provides adequate slope compensation at fifty percent duty cycle and above for all operating frequencies. The need also exists to avoid over-compensation.

DISCLOSURE

The above-described needs of the prior art are fulfilled, at least in part, by developing a compensation signal for a switching regulator that is independent of changes in the switching frequency. The regulator operational frequency is established in accordance with a repetitive ramp signal of constant slope and adjustable frequency. The voltage of the ramp signal is monitored and an offset signal is derived therefrom. A compensation signal is derived based on the ramp signal and the derived offset signal. A duty cycle control signal for the regulator is dependent in part on the developed compensation signal. The peak value of the ramp signal, detected during monitoring, is used to derive the offset signal. Initiation of the compensation occurs at the same percent duty cycle point during each switching cycle and thus is independent of switching frequency. The compensation signal may have a constant slope, or an exponentially increasing slope, and a time duration that is proportional to the difference between the ramp signal and the derived offset signal. Preferably, the derived offset signal is proportional to the detected peak value.

In an exemplified implementation, a compensation circuit is coupled to an input of a switching controller for terminating a switching pulse during each switching cycle. The compensation circuit is configured to output a compensation signal that varies as a function of changes in regulator switching frequency while maintaining a constant percent duty cycle. A peak detector is coupled to a ramp generator. The ramp generator may have an input coupled to an adjustable frequency synchronization signal, thereby to set the frequency of the repetitive ramp signal to the frequency of the synchronizing signal. A peak voltage hold circuit is coupled to the peak detector. Preferably a voltage divider circuit is coupled between the peak voltage hold circuit and a negative input of an amplifier. A summer, coupled in series with the output circuit, has inputs for receiving a signal from the voltage divider and a voltage reference. An output of the summer is fed to the negative input of the amplifier. A positive input of the amplifier is coupled to the ramp generator. An output circuit comprising a transistor, having a control terminal coupled to the amplifier output, and an impedance coupled in series with the transistor provides the compensation signal to the switching regulator.

The series arrangement may further include a first multiplier circuit coupled to the transistor and configured to output a signal that is a function of the peak level of the ramp signal and a second multiplier circuit coupled to the first multiplier circuit and configured to output a signal that is proportional to the square of the signal output by the first multiplier circuit.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 6:
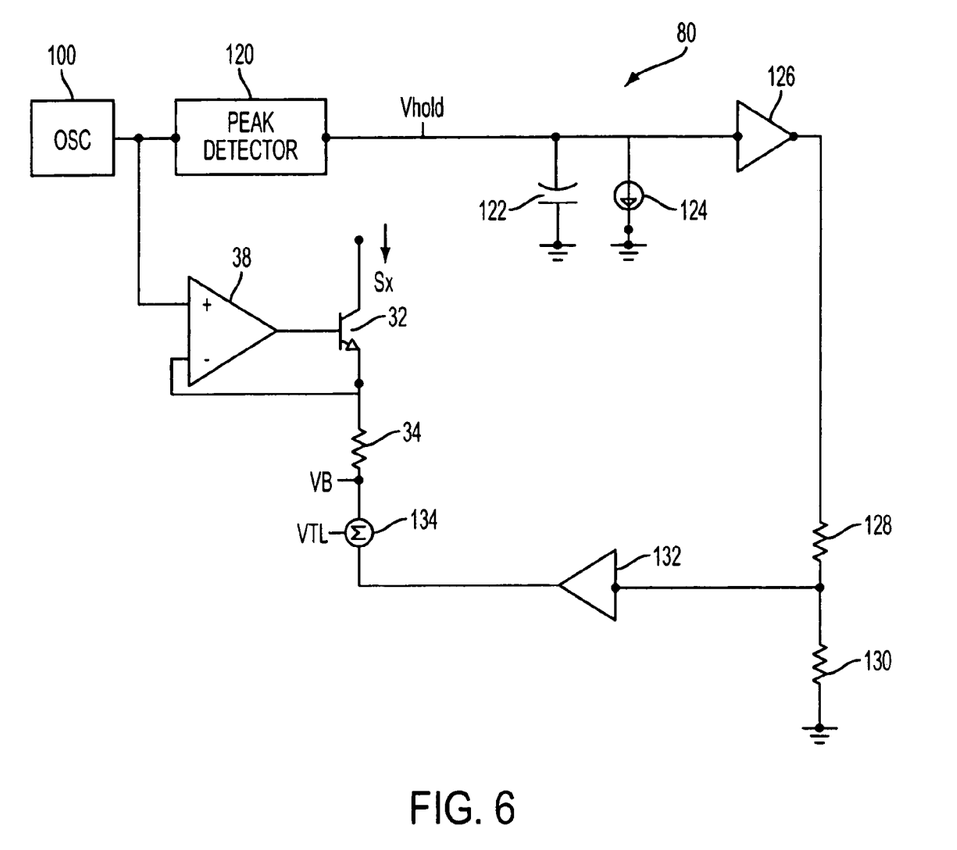
FIG. 6 is a diagram of a slope compensation implementation in accordance with the present invention.
Figure 7A:
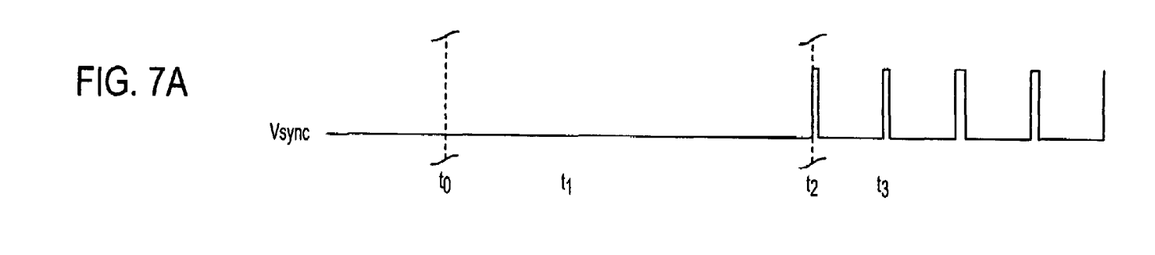
FIGS. 7A-7D is a diagram of waveforms illustrating operation with the compensation arrangement of FIG. 6.
Figure 7B:
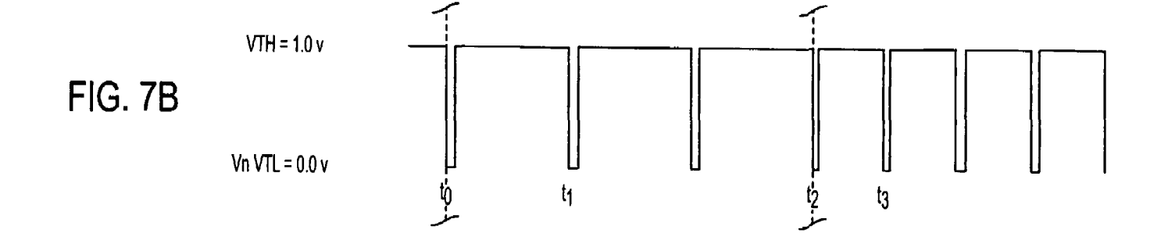
Figure 7C:
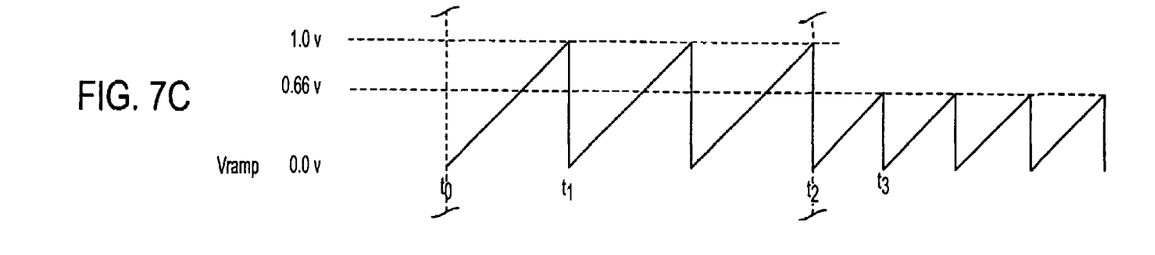
Figure 7D:
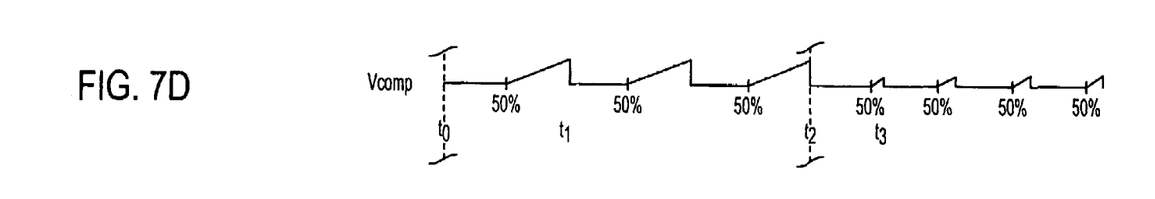

An underlying concept of the present disclosure is based on the realization that loss of slope compensation when the oscillator frequency is increased can be avoided by maintaining the start of the compensation signal Sx at a constant duty cycle Ts. FIG. 6 is a diagram of an implementation 80 for regulating the compensation signal accordingly. The output of oscillator 100 is coupled to peak detector 120 as well as to the positive input of amplifier 38. The negative input of amplifier 38 is coupled to a junction between transistor 32 and resistor 34. Connected in parallel between the output of peak detector 120 and ground are capacitor 122, "droop" current source 124, and the series arrangement of unity gain amplifier buffer 126, resistor 128 and resistor 130. Unity gain amplifier buffer 132 is coupled to a junction resistor 128 and resistor 130. Summer 134 has one input coupled to the buffer 132, another input coupled to a reference voltage Vtl, and an output coupled to resistor 34. Peak detector 120 outputs the peak voltage of oscillator 100, Vhold, which is held temporarily by capacitor 122. Buffers 126 and 132 avoid loading on the capacitor voltage.

The compensation signal Sx is initiated, at time Ts, when amplifier 38 outputs a signal to activate transistor 32. Ts occurs when the Vramp signal at the positive input overtakes the voltage VB applied at the negative input. The voltage VB is a function of the voltage at resistor 130, and thus of the voltage Vpeak. The voltage at the output of buffer 132 can be calculated as follows:

$$V132 = (Vhold*R130)/(R128+R130); \text{ wherein}$$
$$Vhold = Vpeak. \quad (1)$$

The voltage (VB) at the output of summer 134 is thus:

$$VB = V132 + Vtl = (Vpeak*R130)/(R128+R130) + Vtl; \quad (2)$$

wherein Vtl is the base line threshold voltage. In keeping with the earlier described example, the base line voltage for the oscillator Vramp signal is selected to be zero volt; thus Vtl=0.

$$Ts \text{ (in percent duty cycle)} = (VB - Vtl)/(Vpeak - Vtl) \quad (3)$$
$$= (Vpeak*R130)/(R128+R130)(Vpeak)$$
$$= R130/(R128+R130).$$

Ts is thus a constant, determined by values of the resistors R128 and R130.

$$Sx = (Vramp - VB)/R34$$
$$= Vramp/R34 - (Vpeak*R130)/(R34*(R128+R130)). \quad (4)$$

The slope of $Sx = dSx/dt = 1/R34 * dVramp/dt - \text{constant}.$ (5)

Since the charging current of the oscillator is not changed during a change in frequency, dVramp/dt is a constant. From the above formulae, it is evident that Ts and dSx/dt are constant, independent of frequency change. As Vpeak is a measure of operating frequency, the implementation of FIG. 6 tracks Vpeak and accordingly adjusts the start of Sx during each cycle to maintain constant the duty cycle Ts.

FIGS. 7A-7D are diagrams of waveforms illustrating operation with the compensation arrangement of FIG. 6. The voltage threshold levels and charging rate are taken to be the same as the earlier described example for purpose of comparison. The Vsync and Vramp waveforms are the same as those of FIGS. 5A-5D. The peak oscillator output voltage Vpeak changes with changes in frequency, i.e., 1.0 volt at 100 kHz and 0.66 volt at 150 kHz. As shown in the Vcomp waveform, the start Ts of the compensation signal in each cycle, at both frequencies is fifty percent. Compensation is thus provided at every percent duty cycle above fifty percent at all frequencies.

Figure 8:
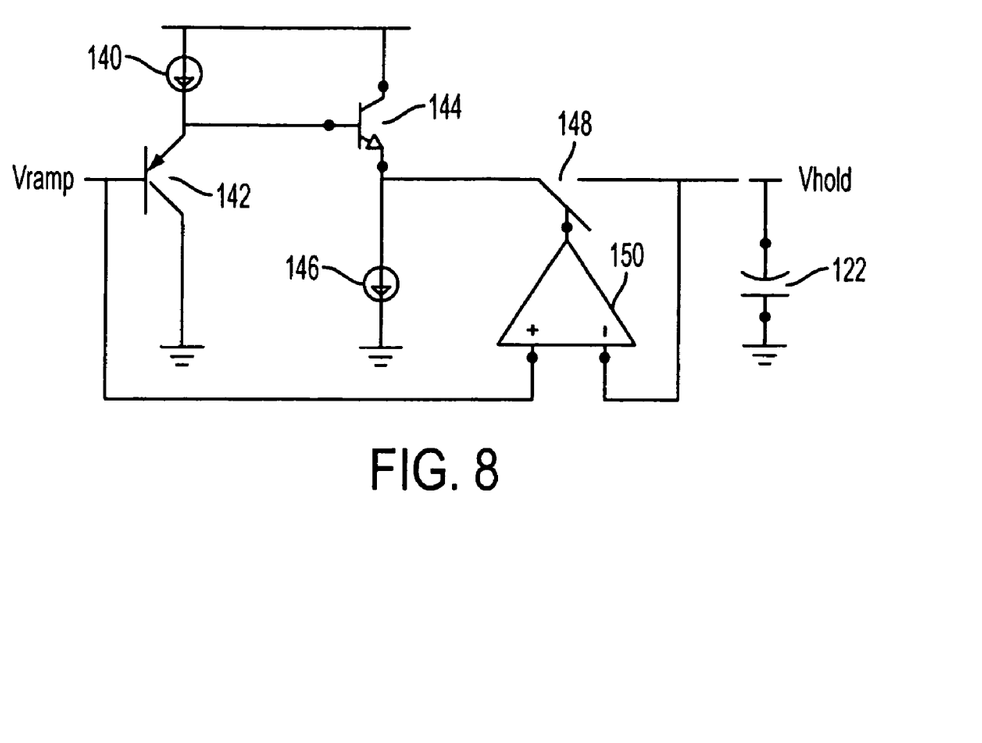
FIG. 8 is a circuit diagram of a peak detector that may be employed in the circuit of FIG. 6.

FIG. 8 is a circuit diagram of a peak detector 120 that may be employed in the circuit of FIG. 6. Current source 140 is coupled in series with PNP transistor 142. NPN transistor 144 is coupled in series with current source 146. The oscillator Vramp signal is applied to the base of transistor 142. The emitter of transistor 142 is coupled to the base of transistor 144. The emitter of transistor 144 is coupled in series with controlled switch 148 and the Vhold terminal of capacitor 122. A positive input of comparator 150 is supplied by the Vramp signal. A negative input of comparator 150 is coupled to a junction between switch 148 and capacitor 122.

The voltage at the emitter of transistor 142 is Vramp plus the base-emitter voltage. The voltage at the emitter of transistor 144 is Vramp plus the base-emitter voltage of transistor 142 minus the base-emitter voltage of transistor 144, i.e., substantially equal to Vramp. The transistors 142 and 144 are buffers for level shift. When switch 148 is closed, Vhold will be forced to equal Vramp. When switch 148 is open, Vhold is isolated from Vramp and is held by capacitor 122. Switch 148 is activated when the voltage at the positive input of comparator 150 exceeds the voltage at the negative input. Vhold will then follow the increase in Vramp. When Vramp goes lower than Vhold, comparator 148 will turn off switch 148.

Vhold thus maintains the peak of the Vramp signal, Vpeak, until a higher peak is reached. If, for example, the oscillator reverts from synchronized operation at 150 kHz to free running 100 kHz operation, the increase in Vpeak will be detected and the compensation signal Sx adjusted to maintain Ts at fifty percent duty cycle. If frequency is increased, Vpeak will decrease. The provision of the "droop" current source 124 (FIG. 6) in parallel with capacitor 122 permits discharge of the capacitor at an appropriate rate to detect a lower Vpeak. In response to the lower value of Vhold, Sx will be adjusted to maintain the percent duty cycle, Ts, constant.

Figure 9:
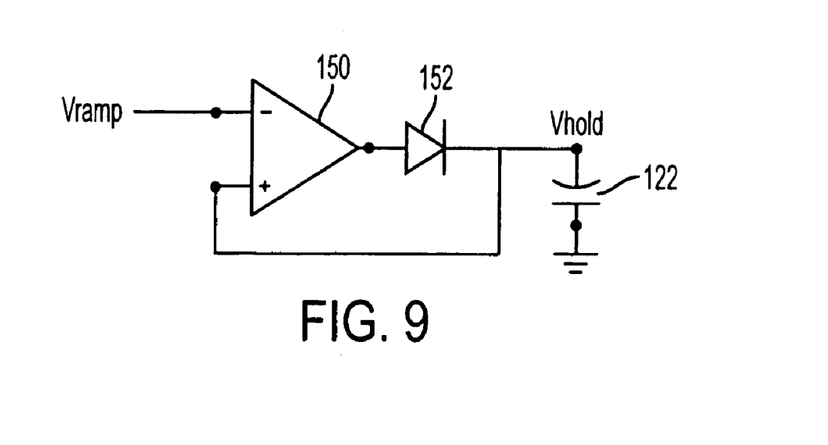
FIG. 9 is a circuit diagram of another peak detector that may be employed in the circuit of FIG. 6.

FIG. 9 is a circuit diagram of another peak detector 120 that may be employed in the circuit of FIG. 6. The Vramp signal is applied to a positive input of unity gain buffer amplifier 150. Coupled in series with the output of amplifier 150 are diode 152 and the Vhold terminal of capacitor 122. The Vhold terminal is coupled to the negative input of amplifier 150. Blocking diode 152 allows flow of amplifier output current only when Vramp is higher than Vhold. When Vramp is higher than Vhold, the diode will be forward biased and Vhold will follow Vramp. When Vramp goes lower than Vhold, the diode will be reversed biased and Vpeak will be held until a higher peak is produced or until the discharge of capacitor 112 by "droop" current source 124 brings Vhold lower than Vramp.

Figure 10:
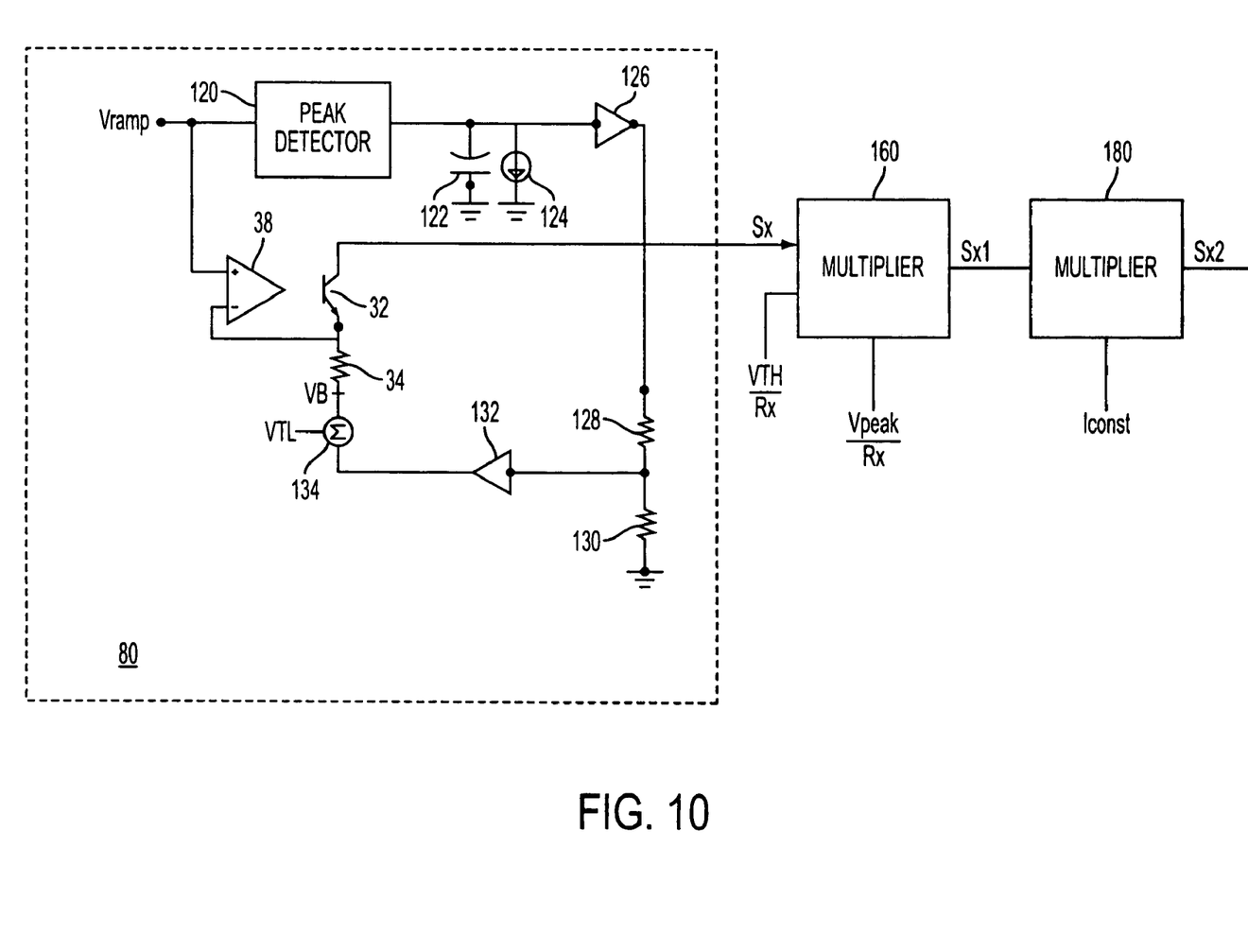
FIG. 10 is a partial block diagram of a variation of the slope compensation implementation of FIG. 6.

FIG. 10 is a diagram of a variation of the slope compensation arrangement of FIG. 6. The FIG. 6 implementation 80 is shown by the elements surrounded by a dashed outline. The linear slope signal Sx output therefrom is not directly applied as the compensation signal input to adder 30. A first multiplier 160 receives the signal Sx and multiplies that signal by the factor Vth/Vpeak to compensate the reduction in Vpeak that occurs with increased frequency. Thus, while block 160 is designated a multiplier in FIG. 10, it performs the function of dividing Vth by Vpeak and multiplying the result by Sx. Sx1, the output of block 160 is Sx * (Vth/Vpeak). Sx1 is applied to a second multiplier 180 to produce an output Sx2. The function of block 180 is multiply Sx1 by itself, the result divided by a constant Iconst. The output Sx2 is (Sx*Vth/Vpeak)$^2$/Iconst. Sx2 is applied as the compensation signal input to adder 30.

Figure 11:
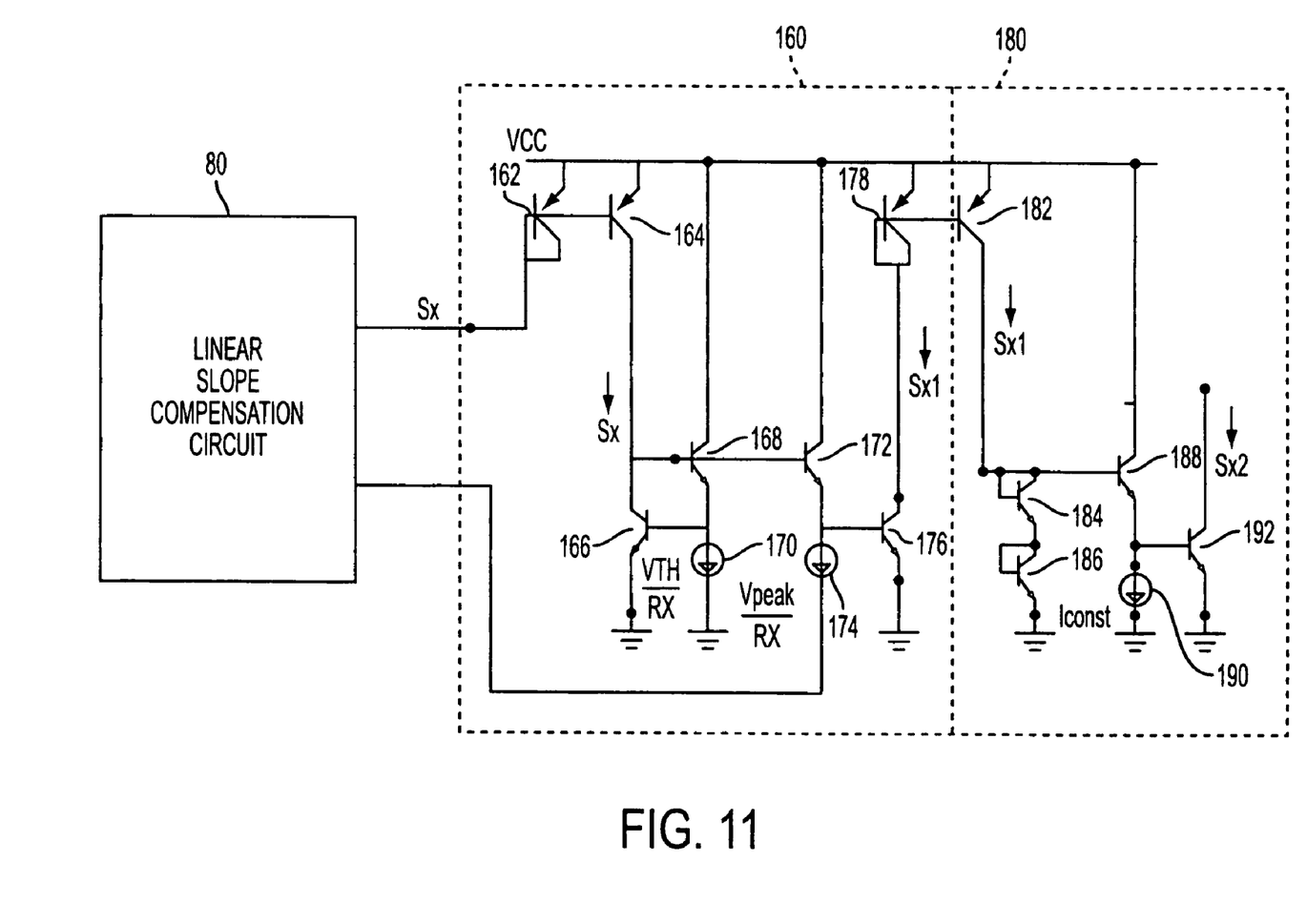
FIG. 11 is a circuit diagram of multipliers that may be employed for blocks of FIG. 10.

Circuits that may be utilized in the multipliers 160 and 180 are illustrated in FIG. 11. The output Sx of the compensation circuit 80 of FIG. 10, which has a linear slope characteristic, is mirrored by transistors 162 and 164. Connected in series between Vcc and ground is the series path including transistors 164 and 166. A parallel circuit path, comprising transistor 168 and current source 170 is also connected between Vcc and ground. Current source 170 is proportional to Vth. The base of transistor 168 is connected to the junction of transistors 164 and 166. The base of transistor 166 is connected to the junction of transistor 168 and current source 170. Transistor 172 is connected between Vcc and current source 174. Current source 174 is connected to the buffer 126 of FIG. 10 and thus is proportional to Vpeak. The base of transistor 172 is also connected to the junction of transistors 164 and 166. Transistor 178 and 176 are connected in series across Vcc and ground. The base of transistor 176 is connected to the junction of transistor 172 and current source 174. The current through transistor 178 is the output Sx1 of multiplier circuit 160.

Sx1 is mirrored by transistor 182 in multiplier circuit 180. Connected in series between Vcc and ground are transistors 182, 184 and 186. The base and collector of each of transistors 184 and 186 are connected together. Connected in series between Vcc and ground are transistor 188 and constant current source 190. The base of transistor 188 is connected to the junction of transistors 182 and 184. The junction of transistor 188 and current source 190 is coupled to the base of transistor 192. The current through transistor 192 is the output Sx2 of multiplier circuit 180 that is applied to the adder 30 as a compensation signal.

Circuits 160 and 180 operate as follows, wherein VBE represents base to emitter voltage; Vt is the thermal voltage of a bipolar resistor; Ic is the collector current of a bipolar transistor; Is is the saturation current of a bipolar transistor and proportional to transistor size; Ie is emitter current; and Rx is an arbitrarily assigned resistor, to convert voltage to current. The functional operation of multiplier 160 is performed by transistors 166, 168, 172 and 176. The voltage at the collector node of transistor 166, is represented as follows:

$$Vc166 = VBE168 + VBE166 = VBE172 + VBE176$$

As the base to emitter voltage (VBE)=Vt ln (Ic/Is), the above relationship becomes:

$$Vt\ln(Ic168/Is168) + Vt\ln(Ic166/Is166) = Vt\ln(Ic172/Is172) + Vt\ln(Ic176/Is176)$$

The transistors 166, 168, 172 and 176 may be chosen to be of the same size so that Is of all of these transistors are equal. Thus:

$$(Ic168)*(Ic166) = (Ic172)*(Ic176); \text{ and}$$

$$Ic176 = [(Ic168)*(Ic166)]/Ic172$$

Since Ic166=Sx, Ic168=Vth/Rx, and Ic172=Vpeak/Rx, and Ic176=Sx1, then:

$$Sx1 = Sx*(Vth/Vpeak)$$

The functional operation of multiplier 180 is performed by transistors 184, 186, 188 and 192. Using the same analysis applied above for multiplier 160, the current of transistor 192 is:

$$Ic192 = [(Ic184)*(Ic186)]/Ic188$$

Since Ic184=Ic186=Sx1, Ic188=Iconst, and Ic192=Sx2, then:

$$Sx2 = (Sx1)^2 / Iconst$$

Figure 12:
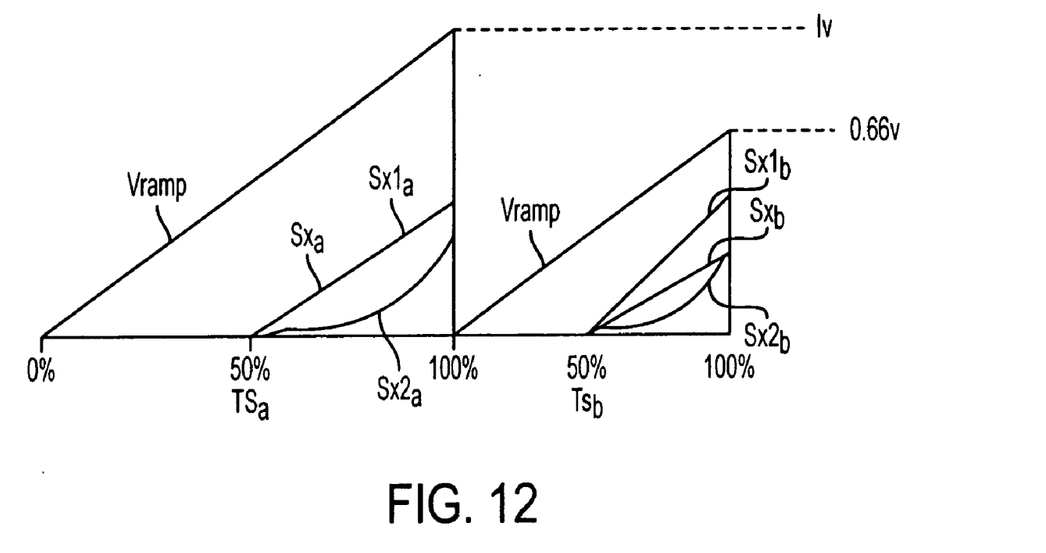
FIG. 12 is a waveform diagram illustrating signals produced by the circuit of FIG. 11.

FIG. 12 is a waveform diagram illustrating the signals Vramp, Sx, Sx1 and Sx2 for the free running oscillator mode and the synchronized oscillator mode, comparable to the conditions illustrated in FIGS. 5A-5D. The left hand portion of the waveform, designated by "a", depicts a free running 100 kHz frequency operation with Vpeak at one volt. The right hand portion, designated by "b", depicts a synchronized 150 kHz frequency operation with Vpeak at 0.66 volt.

At 100 kHz operation, Vpeak is equal to Vth and the signals $Sx_a$ and $Sx1_a$ are equal with linear slope. $Sx2_a$ has an exponential characteristic instead of a linear slope. $Ts_a$ is at fifty percent duty cycle. At 150 kHz operation, Vpeak is no longer equal to Vth. $Sx_b$ and $Sx1_b$ have linear, but unequal, slopes. $Sx2_b$ has an exponential characteristic. $Ts_b$ is at fifty percent duty cycle. As evident from these waveforms for the compensation circuit of FIGS. 10 and 11, the start, of the compensation signal Ts in each cycle is maintained at fifty percent. Compensation is thus provided at every percent duty cycle above fifty percent at all frequencies. As the slope of the compensation signal Sx2 is non-linear, it can satisfy maximum duty cycle requirements without over-compensating at duty cycles closer to fifty percent. The signal $V_C$ is thus a reliable indicator of load current at all duty cycles.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. The principles of the invention are applicable to a variety of voltage regulators, including buck, boost, and buck-boost regulators. By appropriate selection of the parameters of the circuit elements of the compensation circuit and the oscillator circuit, and the operating voltage levels, the slope of Sx and its onset at a constant duty cycle can be defined. If, for example, the use of a particular regulator would find more advantageous use with a compensation signal of a different slope characteristic, or at a constant onset Tx percent duty cycle level other than fifty percent, these ends are attainable within the concepts of the present disclosure.

What is claimed is:

1. A switching regulator comprising:
   a switching controller having an input configured to receive a signal for terminating a switching pulse during a switching cycle, and an output to which a load may be coupled;
   a compensation circuit coupled to the controller input;
   wherein the compensation circuit is configured to output a compensation signal is a function regulator switching frequency while maintaining a duty cycle that is independent of regulator switching frequency;
   a ramp generator configured to produce a repetitive ramp signal; and wherein the compensation circuit comprises:
   a peak detector coupled to the ramp generator;
   an amplifier having a first input coupled to the ramp generator and a second input coupled to the output of the peak detector;
   and an output circuit having a control input coupled to the output of the amplifier and an output coupled to the switching controller.

2. A switching regulator as recited in claim 1, wherein the ramp generator comprises an input coupled to an adjustable frequency synchronization signal and is configured to set the frequency of the repetitive ramp signal to the frequency synchronizing signal.

3. A compensation circuit for a switching regulator comprising:
   a peak detector having an input coupled to receive a repetitive ramp signal and an output;
   an amplifier having a first input coupled to the output of the peak detector, a complementary input coupled to receive the ramp signal, and an output;
   an output circuit coupled to the output of the amplifier and configured to supply to the switching regulator a compensation signal having a duty cycle that is independent of ramp signal frequency;
   a peak voltage hold circuit coupled to the peak detector; and
   a voltage divider circuit coupled between the peak voltage hold circuit and the first input of the amplifier.

4. A compensation circuit for a switching regulator comprising:
   a peak detector having an input coupled to receive a repetitive ramp signal and an output;
   an amplifier having a first input coupled to the output of the peak detector, a complementary input coupled to receive the ramp signal, and an output;
   an output circuit coupled to the output of the amplifier and configured to supply to the switching regulator a compensation signal having a duty cycle that is independent of ramp signal frequency;
   wherein the output circuit comprises:
   a transistor having a control terminal coupled to the amplifier output and an impedance coupled in series with the transistor.

5. A compensation circuit as recited in claim 4, wherein the output circuit further comprises: a first multiplier circuit coupled to the transistor and configured to output a signal that is a function of the peak level of the ramp signal; and a second multiplier circuit coupled to the first multiplier circuit and configured to output a signal that is proportional to the square of the signal output by the first multiplier circuit.

6. A compensation circuit as recited in claim 5, wherein the transistor, the first multiplier circuit and the second multiplier circuit are coupled in series.

7. A compensation circuit as recited in claim 4, further comprising a summer having a first input coupled to the peak detector, a second input coupled to a voltage reference, and an output coupled to the first input of the amplifier.

8. A compensation circuit as recited in claim 7, wherein the summer output is also coupled in series with the output circuit.

9. In a switching regulator, a method comprising the steps of:
   receiving a repetitive ramp signal of constant slope and adjustable frequency that establishes the frequency of regulator switching cycles;
   monitoring the voltage of the ramp signal;
   deriving an offset signal in accordance with the monitored ramp signal voltage;
   developing a compensation signal based on the ramp signal and the derived offset signal;
   setting a percent duty cycle of the compensation signal that is independent of changes in the switching frequency; and generating a duty cycle control signal for the regulator that is dependent in part on the developed compensation signal;

wherein the monitoring step comprises detecting the peak value of the ramp signal, and the offset signal is derived in accordance with the detected peak value.

10. A method as recited in claim 9, wherein the step of setting comprises initiating the compensation signal during each switching cycle.

11. A method as recited in claim 10, wherein the compensation signal is initiated at the same duty cycle point in each switching cycle.

12. In a switching regulator, a method comprising the steps of:

receiving a repetitive ramp signal of constant slope and adjustable frequency that establishes the frequency of regulator switching cycles;

monitoring the voltage of the ramp signal;

deriving an offset signal in accordance with the monitored ramp signal voltage;

developing a compensation signal based on the ramp signal and the derived offset signal;

setting a percent duty cycle of the compensation signal that is independent of changes in the switching frequency; and generating a duty cycle control signal for the regulator that is dependent in part on the developed compensation signal;

wherein the developed compensation signal has a time duration that is proportional to the difference between the ramp signal and the derived offset signal.

13. A method as recited in claim 9, wherein the derived offset signal is proportional to the detected peak value.

14. A method as recited in claim 10, wherein the step of developing comprises:

maintaining the compensation signal at a constant slope.

15. A method as recited in claim 10, wherein the step of developing comprises exponentially increasing the compensation signal.

16. A method for compensating a switching regulator operable at switching cycles of variable frequency, comprising the steps of:

generating a repetitive ramp signal of variable frequency and constant slope;

generating a repetitive compensation signal having a duty cycle that is independent of the ramp signal frequency; and controlling the magnitude of the compensation signal as a function of the peak value of the ramp signal;

wherein the compensation signal exhibits a square slope profile, and wherein the step of generating a compensation signal comprises:

detecting the peak value of the ramp signal; and initiating the compensation signal in response to the detected peak value.

17. A method as recited in claim 16, wherein the step of controlling the compensation signal comprises:

generating a signal having a constant slope;

multiplying the signal of constant slope as a function of the peak value; and squaring the multiplied signal.

* * * * *